(No Model.)
L. DERUELLE.
APPARATUS FOR MAKING SULFURIC ACID.
No. 578,548. Patented Mar. 9, 1897.
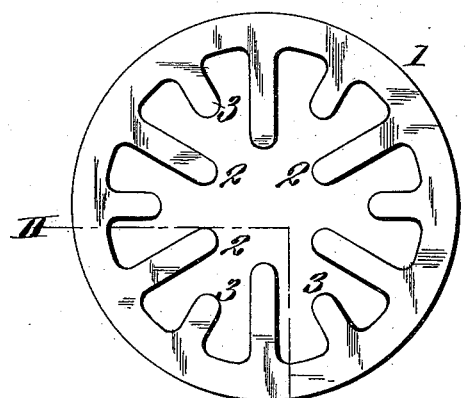
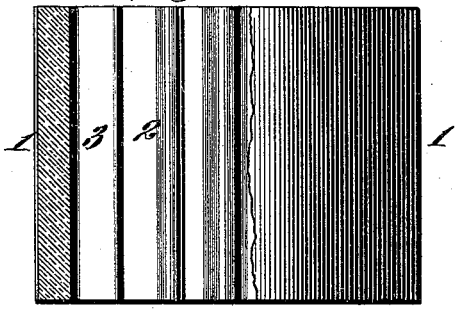

UNITED STATES PATENT OFFICE.

LOUIS DERUELLE, OF ST. LOUIS, MISSOURI, ASSIGNOR TO THE LACLEDE FIRE BRICK MANUFACTURING COMPANY, OF SAME PLACE.

APPARATUS FOR MAKING SULFURIC ACID.

SPECIFICATION forming part of Letters Patent No. 578,548, dated March 9, 1897.

Application filed March 4, 1896. Serial No. 581,727. (No model.)

*To all whom it may concern:*

Be it known that I, LOUIS DERUELLE, a citizen of the United States, residing at the city of St. Louis, in the State of Missouri, have invented a certain new and useful Improvement in Chemical Rings, of which the following is a full, clear, and exact description, reference being had to the accompanying drawings, forming a part of this specification.

It is well known that in the preparation of the sulfuric acid of commerce ordinary sulfur is first burned in atmospheric air, and the sulfurous oxid thus formed is passed into a lead-chamber along with the vapor of nitric acid, and the reaction which then takes place between the two causes the sulfurous oxid to oxidize into sulfuric oxid. These fumes are then absorbed into water. To absorb the gas in the water, it is necessary to expose the water over as large a surface as possible. This is done by allowing it to slowly flow or trickle down over a tower of peculiar construction suitably placed in a chamber into which is introduced the gaseous sulfuric acid. My invention relates to the manner of constructing the tiles composing this tower; and it has for its object the exposing of the greatest possible surface of the water for contact with and absorption of the sulfuric-acid gas. I accomplish this object by means of the tile illustrated in the accompanying drawings, in which—

Figure I shows a top view of one of the tiles or chemical rings. Fig. II shows a side elevation thereof, the portion inclosed in line II II of Fig. I being broken away.

1 is the outside wall of the ring or tile, which is cylindrical in shape. This wall is thick enough to stand ordinary usage. I construct it with an open interior, said interior having inwardly-projecting radial corrugations, alternately long and short and disconnected from each other. 2 are the longer projections, and 3 are the shorter. As the water into which the sulfuric-acid gas is to be absorbed passes from the top to the bottom of the rings it is spread over the large surface area of the rings. The gas is thus brought in contact with the maximum amount of water, and the manufacture of the commercial sulfuric acid is consequently greatly simplified.

I prefer to construct the rings out of fireclay, but shale or any other suitable material may be used.

I claim as my invention and desire to secure by Letters Patent—

An earthenware chemical ring comprising a cylindrical body and inwardly-projecting alternating long and short radial corrugations disconnected from each other so as to provide free flanges; substantially as described.

LOUIS DERUELLE.

In presence of—
 E. S. KNIGHT,
 STANLEY STONER.